Aug. 30, 1932.　　　　O. K. OWEN　　　　1,875,126
GREENHOUSE OPERATION SYSTEM
Filed April 25, 1929
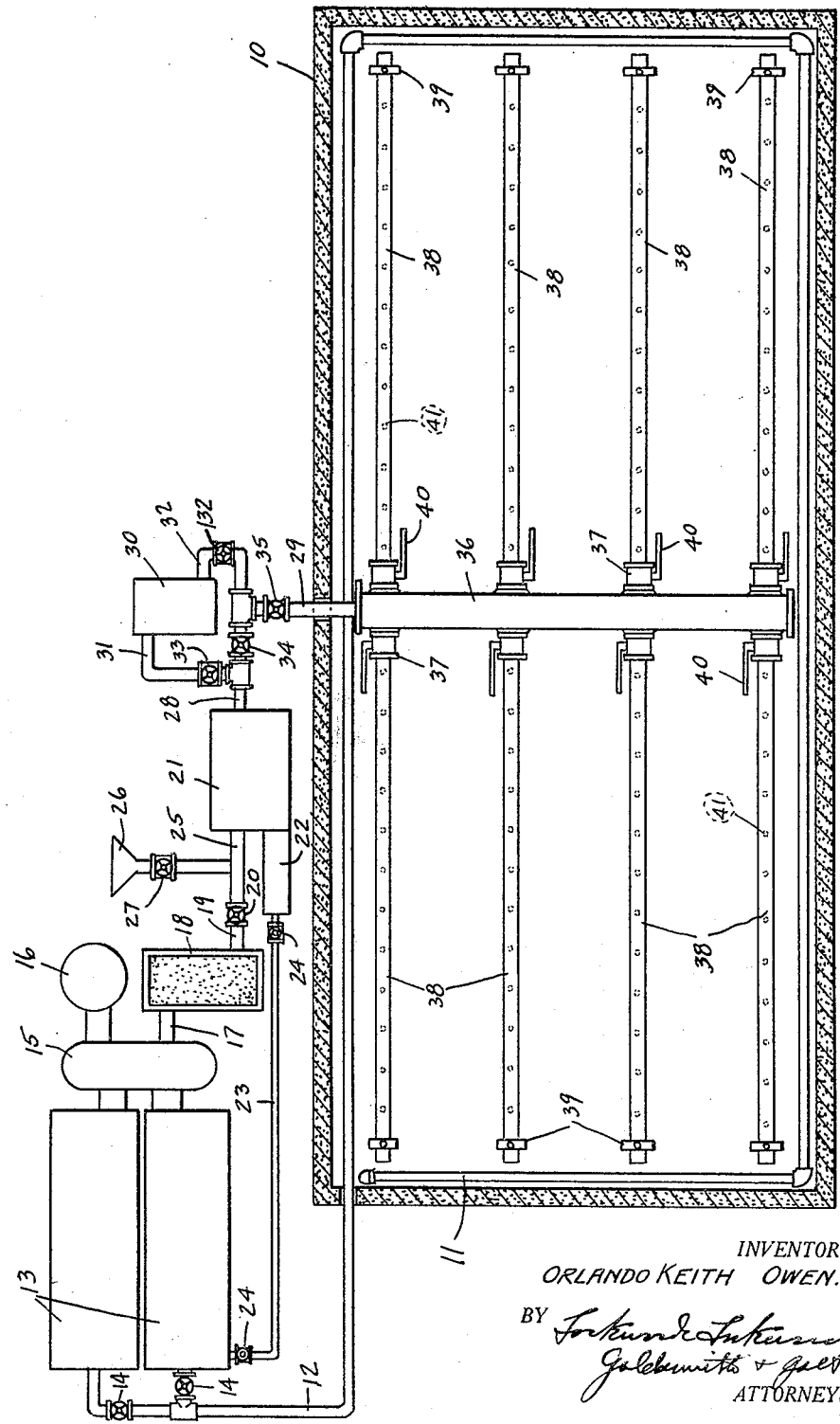
INVENTOR.
ORLANDO KEITH OWEN.
BY
ATTORNEYS.

Patented Aug. 30, 1932

1,875,126

UNITED STATES PATENT OFFICE

ORLANDO K. OWEN, OF TERRE HAUTE, INDIANA, ASSIGNOR TO J. W. DAVIS COMPANY, OF TERRE HAUTE, INDIANA, A CORPORATION

GREENHOUSE OPERATION SYSTEM

Application filed April 25, 1929. Serial No. 358,017.

This invention relates to a system of greenhouse operation and apparatus therefor.

The chief object of this invention is to facilitate and expedite the growth of vegetation in greenhouses or the like by circulating therein carbon dioxide, and if desired some air, which carbon dioxide is readily available and very cheaply obtained in a non-deleterious form.

The chief feature of the invention consists in the utilization of flue gases obtained from the heating system of the greenhouse including purifying the flue gases and then distributing the same in the greenhouse.

The full nature of the invention will be more fully understood from the accompanying drawing and the following description and claims.

The figure in the drawing is a diagrammatic lay-out of a greenhouse with an associated heating plant and the apparatus of the invention incorporated therewith.

In the drawing 10 indicates an outline representation of a greenhouse around the walls of which in the usual manner are the heating coils 11 supplied by line 12 from boilers 13, said supply being controlled by the valves 14. The boilers may be of any desired type and the flue gases discharge to the breeching 15 and thence to the stack 16 in the customary manner.

The tap 17 from the breeching discharges into a purifier which may be termed a scrubber 18. The discharge line 19 therefrom is controlled by valve 20. The scrubber contains coke and running water passes through it. It washes the flue gases.

A compressor of the reciprocating type 21 is associated with the reciprocating power 22 preferably operable by steam from a line 23 also supplied by the boiler and controlled by valves 24. The compressor intake 25 not only communicates with the scrubber discharge but also communicates with an air intake 26 controlled by valve 27. The proper proportion of air to scrubbed flue gases may be thus adjusted by controlling valves 20 and 27. If desired compressed air may be circulated without any flue gas therein or flue gas may be circulated without any air. The compresser serves to suck or draw the flue gases through the purifier or scrubber 18.

The compressor discharge 28 communicates either directly or indirectly with a head or intake line 29. The indirect communication includes an additional scrubber 30 having the intake 31 and the discharge 32. Line 31 includes valve 33 and line 28 includes valve 34 and line 32 includes valve 132. The entire or main control valve 35 is located in line 29. The compressed air and flue gas or either, hereinafter called the compressed medium, is supplied to line 28 and may be passed therefrom and forced through valve 33 and line 31 to and through the scrubber 30 and thence to line 29 through the discharge 32 and valve 35, the valve 34 being closed. If direct connection is desired valve 33 is closed and valve 34 is opened whereupon the compressed medium passes directly from line 28 through valves 34 and 35 to the header intake 29.

Suitably supported within the greenhouse and positioned substantially midway therein and extending transversely across the same is a header 36 which rotatably supports a combination swivel and valve construction 37 from which extend the distributing lines of pipes 38. These extend longitudinally of the greenhouse and transversely of the header. The outer end of the distributor pipe may be rotatably supported by the bearing, hanger or support 39. The handle 40 of the combination swivel valve not only serves as a control valve for controlling the fluid as to the rate of discharge but also constitutes an arrangement whereby the distributing tube may be rotated, since it is pivotally supported, to the desired position such that the outlets 41 therein have the predetermined directional discharge.

It is known that with proper combustion flue gases contain a maximum of carbon dioxide $CO_2$ and that the sulphur content of the coal generally is reduced to sulphur dioxide. The scrubber washes the flue gases so that there is obtained a gas that is substantially free from tar and ash. The result is that the nitrogen content remains approximately the same in volume since but little of it is dissolved and the sulphur dioxide content may or may not be changed. Sulphur fumes are generally considered a germicidal or fumigating agent, and therefore a small portion of sulphur dioxide is not believed objectionable, but desirable. The employment of a compressor serves to impart sufficient energy to the system so that the desired distribution of the compressed medium obtains through the employment of the distributing apparatus hereinbefore described.

The carbon dioxide content it is well known is the chief plant food derived from air. The employment of clean flue gases therefor supplies the germicidal or fumigating agent, sulphur dioxide, and the growth agent, carbon dioxide. It has also been found that the circulation of this compressed medium, which circulation is obtained by reason of the compression imparted thereto, and the release thereof also induces the growth of healthy vegetation by securing within the greenhouse uniform circulation of the air content therein. In other words the discharge of this compressed supply medium serves to keep the air in the greenhouse in a constant state of motion thereby resulting in better plant growth.

The invention claimed is:

1. The process of commercially accelerating plant growth in a greenhouse consisting of burning fuel for simultaneously generating greenhouse heat and flue gas, scrubbing the flue gas, adding air to the scrubbed gas, compressing the air and gas mixture, and then liberating the compressed air and gas mixture in the greenhouse.

2. The process of commercially accelerating plant growth in a greenhouse consisting of burning fuel for simultaneously generating greenhouse heat and flue gas, scrubbing the flue gas, adding air to the scrubbed gas, scrubbing the mixture of air and flue gas, and then liberating the scrubbed air and gas mixture in the greenhouse.

3. The process of commercially accelerating plant growth in a greenhouse consisting of burning fuel for simultaneously generating greenhouse heat and flue gas, scrubbing the flue gas, adding air to the scrubbed gas, compressing the air and gas mixture, scrubbing the compressed air and gas mixture, and then liberating the compressed scrubbed air and gas mixture in the greenhouse.

4. The process of commercially accelerating plant growth in a greenhouse consisting of burning fuel for simultaneously generating greenhouse heat and flue gas, scrubbing the flue gas by induction, then scrubbing the flue gas by compression, and then liberating the multiple scrubbed gas in the greenhouse.

In witness whereof, I have hereunto affixed my signature.

ORLANDO K. OWEN.